COMBINED TIRE GAUGE AND FILLING VALVE

Original Filed March 15, 1928 2 Sheets-Sheet 1

INVENTOR.
Amos S. Marchus
BY M. C. Frank
ATTORNEY

July 24, 1934. A. S. MARCHUS Re. 19,252
COMBINED TIRE GAUGE AND FILLING VALVE
Original Filed March 15, 1928 2 Sheets-Sheet 2
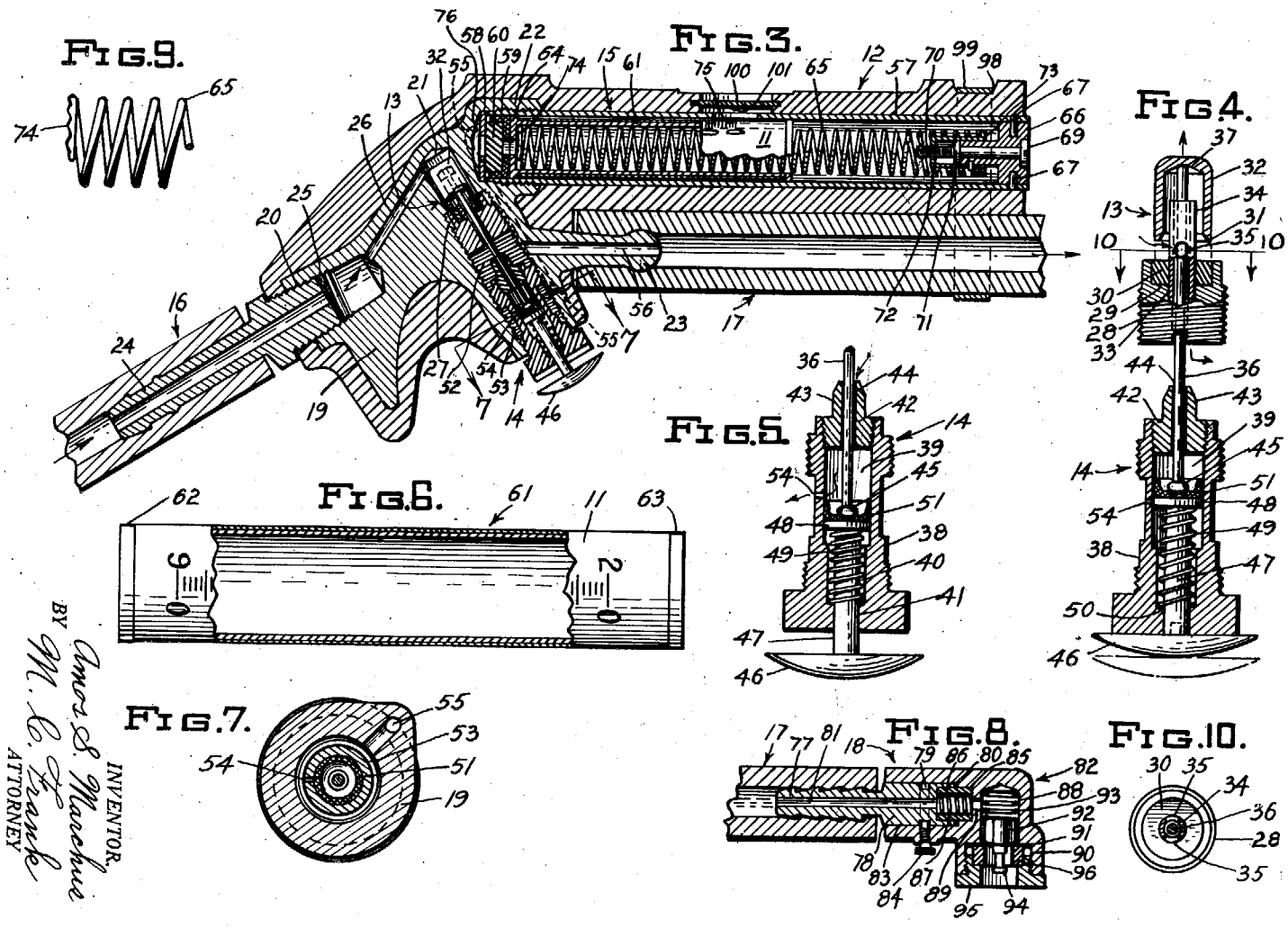
INVENTOR.
Amos S. Marchus
BY M. C. Frank
ATTORNEY Reissued July 24, 1934

Re. 19,252

UNITED STATES PATENT OFFICE 19,252

COMBINED TIRE GAUGE AND FILLING VALVE

Amos S. Marchus, Oakland, Calif.

Original No. 1,715,463, dated June 4, 1929, Serial No. 261,790, March 15, 1928. Application for reissue September 6, 1930, Serial No. 480,268

6 Claims. (Cl. 152—11.5)

The present invention relates to improvements in air valves generally, and in particular to an improved combined inflating valve and gauge adapted for use in garages, service stations and the like for inflating automobile tires and other inflatable objects.

The primary object of my invention is the provision of a combined tire gauge and filling valve which when in use and under pressure may first be applied to the air valve of a tire to ascertain the pressure therein, then by the manipulation of the trigger valve incorporated in my device the said air under pressure will be dispensed to the said tire, and upon the release of said trigger valve the pressure in the tire will automatically be registered in the gauge of my invention, then if the desired pressure in the tire has not been reached, my valve is manipulated again and upon release the new pressure may be read.

An important object of my invention is to provide a combined inflating valve and gauge which is compact, durable, comparatively simple in construction, positive in its action and accurate in recording and which is constructed in the form of a pistol to greatly facilitate its handling, operation and reading.

Another object of the invention is to provide a device of this character which is provided with a handy grip conforming to the butt of a pistol, with its valve-tripping mechanism so arranged as to be conveniently reached and tripped by the "trigger finger" of the operator.

Another object of the invention is the provision of a device of the class indicated which is completely enclosed in a soft rubber protective covering, which protects the working parts against disarrangement and breakage due to possible rough usage thereof, and also lends warmth to its handling in cold weather.

Still another object of the invention is the provision of a device which is provided with an air valve having a trigger means operable from one side of the device which greatly facilitates the actuation of the valve, and additionally aids in the rapid assemblage or disassemblage of the working parts thereof.

An additional object is to provide such a device with a novel gauge mechanism which is easy to operate by reason of its being initially set to register at a predetermined pressure, generally twenty pounds, thus considerably shortening the travel of the gauge-registering barrel.

Still another object of the invention is the provision of a rubber-encased device in which the glass gauge dial thereof is sealed in the rubber covering of the apparatus to protect it from breakage and to render the device completely water, air and rust proof as a whole.

A further object of the invention is the provision therein of a valve mechanism having a novel valve and valve-tripping mechanism.

Additional to the foregoing objects is the provision of a device which includes a novel swivel chuck adapted to be readily applied to the tire valve to be inflated.

Other and ancillary objects of my invention will be suggested in the following description and in the use of the device of my invention. Certain of the objects or certain portions or combinations of the objects of my invention may be attained with the use of less than all its advantageous features, or with modifications within its purview. It is petitioned therefore, that my invention be limited only by the claims constituting its final determination.

Referring to the drawings:

Figure 3 is a longitudinal mid-section illustrating the interior arrangement of the various parts constituting the device, the section being indicated by the line 3—3 in Figure 2.

Figure 4 is an enlarged sectional view of the valve mechanism per se removed from the device, the main inlet valve being shown in open position.

Figure 5 is a sectional detail of the said valve mechanism and illustrating the gauge-actuating valve and valve-operating stem, this valve being also shown in open or operative position.

Figure 6 is a view, partly in section, of the register-barrel which carries the pressure-recording indicia.

Figure 7 is a transverse section taken through the body of the device at the line 7—7 as indicated in Figure 3, and shows the position of the air port leading from the valve to the gauge barrel.

Figure 8 is a sectional detail of the swivelled chuck.

Figure 9 is a detail of the gauge spring showing its serrated inner end to prevent turning of the register cage.

Figure 10 is a plan section showing the arrangement of the air inlet openings of the main valve, the section being indicated by the line 10—10 in Figure 4.

Figures 1, 2, 11:
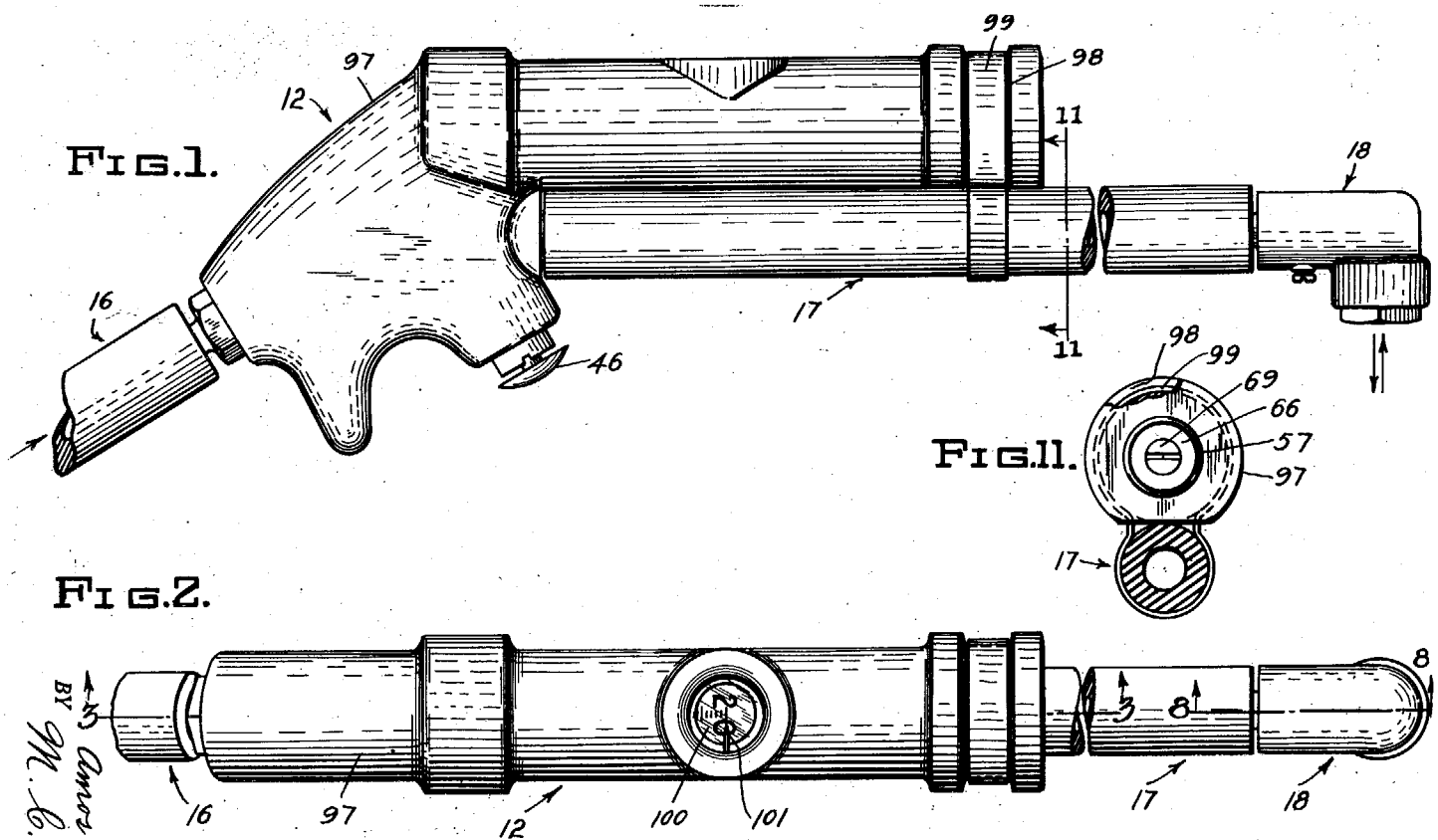
Figure 1 is a side elevation illustrating the exterior contour of the rubber-encased device and showing the air inlet and outlet lines connected for use and the swivelled chuck mounted in the end of the outlet line.
Figure 2 is a plan view showing the various parts shown in Figure 1 and further illustrates the gauge dial and dial pointer by means of which the tire pressure is indicated.
Figure 11 is a transverse sectional detail taken through the outlet line and looking toward the outer end of the device and showing the method of clamping the outlet line to the valve barrel, the section being indicated by the line 11—11 in Figure 1.

Referring to the drawings in detail in which an embodiment of my invention is illustrated, the numeral 12 in a general way indicates the combined apparatus as a whole, and which comprises a main inlet valve mechanism, 13, gauge valve mechanism, 14, gauge mechanism, 15, inlet line, 16, outlet line, 17, and swivel chuck, 18.

The main portion of the device consists of a pistol-shaped casting, 19, having an inlet bore, 20, formed at one end, an angularly disposed valve bore, 21, an interiorly-threaded gauge-barrel boss, 22, and an outlet nipple, 23. A hose nipple, 24, is tapped into the threaded bore, 20, of the device and provides means for the attachment of the pressure line, 16, which in turn communicates with any suitable source of fluid pressure, not shown. A filtering screen, 25, is positioned in the bore, 20, and filters the incoming air before it reaches the valve bore, 21; said bores, 20 and 21, being in communication by means of a port, 26, drilled through the casting as shown in Figure 3.

The bore, 21, communicates with an interiorly-threaded bore, 27, of considerably larger diameter, which bore, 27, extends downwardly and emerges at the underside of the casting. The main valve, 13, consists of a plug, 28, Figure 4, having exteriorly arranged threads adapting it to be screw seated into the threaded bore, 27, as shown in Figure 3. This plug, 28, is provided in its upper face with a recess, 29, in which is seated a rubber ring, 30, forming a valve seat upon which the lower bevelled edge, 31, of the valve cap, 32, is adapted to remain normally seated when my invention is in service.

The plug, 28, is bored centrally as indicated at 33 and a small tube, 34, is secured in this bore and extends upwardly through the ring, 30, and terminates thereabove, the said tube being provided with transverse air inlet openings, 35, positioned just above the upper face of the ring, as clearly shown in Figure 4.

A valve stem, 36, fits loosely in the plug bore and tube, 34, and normally engages in the upper end, 37, of the cap bore by means of spring urge as hereinafter described.

The gauge valve mechanism, 14, Figure 5, comprises an exteriorly-threaded shell, 38, adapted also to be screw seated into the bore, 27, but below the plug, 28, and has an axially-disposed bore, 39, a communicating bore, 40, of smaller diameter, and a communicating stem-bore, 41, of still smaller diameter than either of the above mentioned bores. A plug, 42, is screw seated into the upper end of the bore, 39, and said plug is provided with a neck, 43, and an axial bore, 44, through which the stem, 36, slidably operates, the lower end of said stem being provided with a head, 45.

The main valve tripping mechanism consists of a trigger in the form of a rounded head, 46, having an upwardly extending stem, 47, slidably fitting in the bore, 41, and having an annular head, 48, formed at its upper end. A compression spring, 49, surrounds the stem, 47, and rests upon the shoulder, 50, formed in the lower end of the bore, 40, of the shell; said spring tending to normally urge the head, 48, upwardly until brought to a stop by the head, 46, as clearly shown in Figure 4.

A leather valve cup, 51, is mounted in the bore, 39, and rests upon the head, 48, and forms a tight fit in said bore when pressure is introduced into the bore, 39, by way of the plug bore, 44.

When the gauge valve mechanism, 14, is positioned in the bore, 27, Figure 3, it will be noted that a chamber, 52, is formed therein above the plug, 42, and a second chamber, 53, is formed exteriorly of the shell, 38, which is entirely independent of said chamber, 52. The chamber, 53, communicates with the bore, 39, by means of a needle bore, 54, Figure 5, extending through the wall of the shell and said chamber, 53, in turn communicates with a port, 55, leading up through the casting and entering the inner end of the gauge barrel, as shown in Figures 3 and 7. The chamber, 52, communicates with the inlet tube, 34, and the outlet air port, 56, formed in the outlet nipple, 23.

The gauge mechanism of my device comprises a barrel, 57, screw-seated into the interiorly-threaded boss, 22, and having its open inner end partially closed by a perforated disc, 58, which forms a seat against which the gauge plunger normally abuts; said plunger consisting of a leather cup, 59, and a rubber disc seat, 60, which disc, 60, seals the perforation in the disc, 58, when seated thereagainst, as shown in Figure 3.

A spring cage, 61, having annular beaded ends, 62 and 63, slidingly fits within the gauge barrel, 57, and is substantially one-half the length of said gauge barrel. The cage is provided at its inner end with a head, 64, against which the gauge spring, 65, bears.

The outer end of this gauge barrel is provided with a plug, 66, pinned to the barrel by means of diametrically disposed pins, 67, said plug having an inwardly extending stem provided with a centrally-disposed bore for the reception of a swivel pin, 69, which pin is provided at its outer end with a screw head and at its inner end with a threaded portion, 70, and an intermediate shoulder, 71, preventing its longitudinal movement in the bore. A thimble, 72, is mounted upon the stem and the threaded end, 70, of the pin extends through the threaded inner end of said thimble adapting it for longitudinal adjustment relative to the plug, 66, said thimble bearing at its outer end an annular rim, 73, forming a seat for the outer end of the spring, 65, and adapting said spring for adjustment by compressing or expanding the same as desired in the calibration of the gauge of the device.

The cage, 61, is provided between the beads, 62 and 63, thereof with a graduated strip of paper, 11, or other suitable material bearing the pound graduations for pressure ranging from 20 to 90 as shown in Figure 6. These graduations are kept uppermost at all times by the serrated inner end, 74, of the spring, 65, which prevents the cage's turning in the barrel, 57. The upper side of the barrel, 57, is provided with a slight opening, 75, through which the graduations on the cage may be viewed in reading the indicated pressure.

A chamber, 76, is formed in front of the barrel disc, 60, and which communicates with the port, 55, and the interior of the gauge barrel through the perforation in said disc whereby fluid pressure may be admitted to the gauge plunger for causing its outward movement together with the spring cage against which the plunger abuts, this movement taking place only upon the release of fluid pressure from the tire into the chamber, 53, as hereinafter described.

The chuck, 18, is swivelly mounted in the end of the outlet line as shown in Figure 8, said outlet line, 17, being not longer than a foot or so for the convenient handling of the chuck by the free hand of the operator. This chuck comprises a nipple, 77, having a finished portion, 78, provided with an annular groove, 79, and a recessed inner end, 80, communicating with the bore, 81, through said parts. The angle fitting, 82, is provided with a bore, 83, adapted to receive the portion, 78, and to rotate freely thereon and is held in connected relation thereby by means of a screw, 84, which screw has its inner end projecting into the groove, 79. A counter bore, 85, is formed in the angle fitting, 82, and said bore is of the same diameter as the recess in the end portion, 80, both being adapted to receive a short piece of rubber tubing, 86, which forms the union at the joint between the angle fitting, 82, and the nipple, 77. This tube prevents leakage of air at these parts by reason of its cylindrical expansion when fluid pressure is admitted to the swivel, 18, the action being assisted by means of a small coil spring, 87, which is fitted into the tube and which also prevents the tube from collapsing.

The valve end of the chuck is provided with a bore, 88, positioned at right angles to the bore, 81, and communicates therewith by means of a port, 89. A counterbore, 90, of larger diameter than the bore, 88, provides a seat for a disc, 91, which disc is centrally perforated and provides a guide and seat for a grooved valve member, 92, normally held seated by a spring, 93, mounted above the member, 92, in the bore, 88. This valve, 92, is provided with a downwardly projecting stem, 94, which is adapted to contact and bear against the stem of the tire valve (not shown) of the tire to be inflated to open the said tire valve, and which action simultaneously unseats the valve, 92, and permits the flow of air from the tube, 17, to the inner tube of the tire as long as it is held in place by the operator with the trigger, 46, functioning. A bushing, 95, secures a rubber gasket ring, 96, in place against the disc, 91, and provides an air tight seat when pressed against the edge of the tire valve stem.

The entire device when assembled is provided with a fairly thick covering of soft rubber, 97, which is vulcanized or molded thereon in any suitable manner, the barrel end of the covering being grooved as indicated at 98 to receive a flat metal ring, 99, which is fitted in the groove and also adapted to encompass the tube, 17, which ring is then crimped in place as shown in Figure 11 to tightly bind the tube, 17, and barrel of the device together. The gauge glass, 100, and indicator pointer, 101, are set into the rubber as shown in Figures 2 and 3.

The operation of my invention is as follows:

Assuming that the line, 16, is under say from sixty-five to ninety pounds of air pressure, from any suitable source, air will enter the valve bore region, 21, and hold the cap, 32, tightly seated upon its seat, 30, and force the stem, 36, downwardly and set the trigger or head, 46, in "cocked" position as shown in Figures 3 and 5. When ready to deliver air, the operator grasps the butt of the device as he would a pistol with the forefinger of the hand resting on the trigger, 46, and with the other hand he holds the swivel chuck in place upon the tire valve to be inflated in the usual way, and which action opens the tire valve. Slight pressure is now brought to bear against the trigger which forces it to the position shown in Figure 4, thereby unseating the cap, 32, by an upward thrust of the stem, 36. Air pressure is now free to escape from the line, 16, by way of the openings, 35, the chamber, 52, and thence through the port, 56, to the outlet line, 17, and chuck, 18.

Upon releasing the trigger, 46, the pressure in the bore, 21, automatically seats the valve cap, 32, again and returns the parts to their initial positions, as shown in Figure 3. At this point of the air filling the pressure in the inflated tire may be ascertained, the tire valve being open, the confined fluid pressure in the tire backs up through the line 17, and into the chamber, 52, from whence it travels through the bore, 44, of the plug, 42, and into the bore, 39. This incoming air causes the valve, 51, to be depressed to the position shown in Figure 5, thereby opening the needle port, 54, to the chamber, 53, and thence through the port, 55, to the chamber, 76, and finally to the plunger of the gauge, thereby forcing the graduated spring cage outwardly until equalization is reached, whereby the indicated pressure may be read.

When the reading has been taken the chuck may be released if the pressure is sufficient, or if insufficient the trigger is again tripped to unseat the valve, 32, and allow an additional flow of air to the tire.

The spring, 49, tends to keep the head, 48, of the valve, the cup, 51, and the head of the stem, 36, in contact at all times, and said spring also assists in a measure in unseating the valve cap, 32, when pressure is applied to the trigger, 46, by the operator. It also serves to assist the closing of the needle port, 54, by the cup valve, 51, as shown in Figure 4, during the period of time that the valve cap, 32, is unseated in the inflation of the tire.

From the foregoing description taken in connection with the accompanying drawings, the advantages of the construction and method of operation will be readily understood by those skilled in the art to which the invention appertains, and while I have described the principle of operation, together with the device which I now consider to be the best embodiment thereof, I desire to have it understood that the device shown is merely illustrative, and that such changes may be made, when desired, as fall within the scope of the appended claims.

I claim:—

1. In a device of the character described, a body, a gauge mechanism carried by said body, and a resilient covering constantly enclosing said body and gauge mechanism and providing a sight opening for reading the pressure registered by said mechanism.

2. In a device of the character described, a body, a gauge mechanism carried by said body, a resilient covering constantly enclosing said body and gauge mechanism and providing a sight opening for reading the gauge indications, and a glass embedded in said covering to provide a sealed-in closure for said sight opening.

3. In a device of the character described a metallic body housing a valve structure and constantly inclosing a gauge mechanism, said body being apertured for reading the pressure registered by said mechanism and a substantial resilient protective form arranged on and around said body, said aperture being visible.

4. In a combined tire gauge and filling valve comprising a comparatively small light metallic body constantly inclosing a valve and gauge mechanism, said body being apertured for reading the pressure registered by said mechanism and a comparatively thick resilient protective form encompassing said body, the external dimensions of said form being considerably greater than the dimensions of said body, said aperture being visible.

5. An apparatus of the character described including a metallic body constantly inclosing a valve and a gauge mechanism, said body being apertured for reading the pressure registered by said mechanism and a substantial resilient protective form moulded directly on said body and providing for hand grasp, said aperture being visible.

6. In a device for the purpose indicated a metallic body constantly inclosing a valve and gauge mechanism, said body being apertured for reading the pressure registered by said mechanism and a substantial resilient protective form moulded on and around said body, a portion of said form being directive in positioning said body for manual operation of the valves and reading the pressure registered thru the aperture, said aperture being visible.

AMOS S. MARCHUS.